A. BRASEN.
ANTISKID DEVICE.
APPLICATION FILED APR. 14, 1917.

1,277,288.

Patented Aug. 27, 1918.
2 SHEETS—SHEET 1.

WITNESSES

INVENTOR
A. Brasen,
BY Victor J. Evans
ATTORNEY

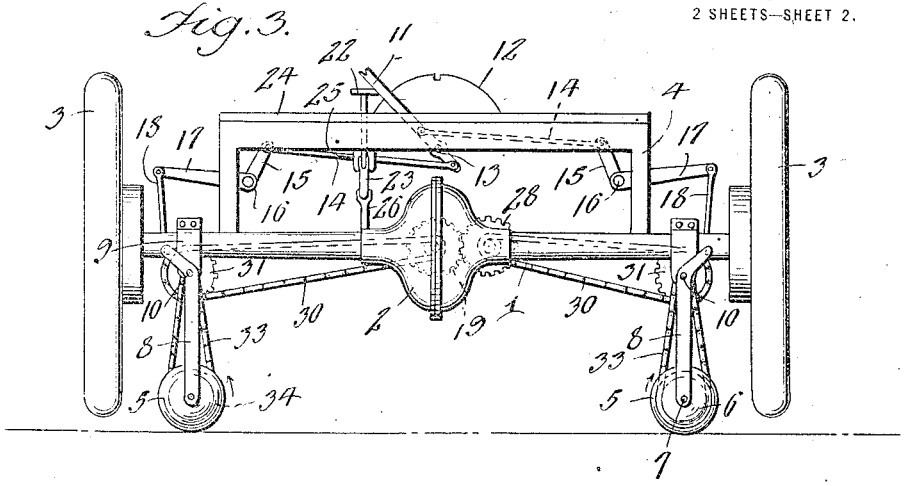
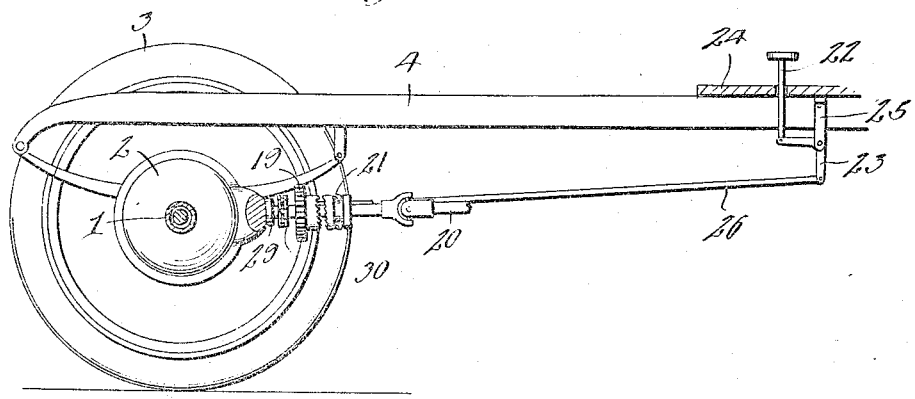
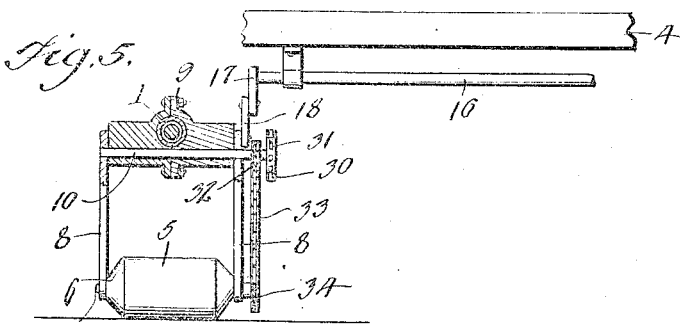

UNITED STATES PATENT OFFICE.

AXEL BRASEN, OF ASTORIA, NEW YORK.

ANTISKID DEVICE.

1,277,288. Specification of Letters Patent. Patented Aug. 27, 1918.

Application filed April 14, 1917. Serial No. 162,074.

*To all whom it may concern:*

Be it known that I, AXEL BRASEN, a subject of the King of Denmark, residing at 101 Flushing avenue, Astoria, Long Island, in the county of Queens and State of New York, have invented new and useful Improvements in Antiskid Devices, of which the following is a specification.

This invention relates to antiskid devices for motor vehicles, the broad object in view being to provide in connection with the wheel base or chassis of a motor vehicle, one or more rotary motor driven antiskid members, each of which is preferably of cylindrical formation and arranged to rotate on an axis at right angles to the vehicle axis. A further object of the invention is to provide in connection with said antiskid member or members, means for positively driving said member or members so as to cause it or them when in contact with the ground to roll toward opposite sides of the machine, the supporting or controlling means for said member or members being such that as they approach the outer limit of their movement, they serve to raise the vehicle wheels from the road surface and thereby interrupt any skidding action of said wheels.

Another object of the invention is to provide in connection with such antiskid members, raising and lowering means whereby they may be elevated clear of the road surface or allowed to move downwardly into engaging contact with the road surface.

With the above and other objects in view, the invention consists in the novel construction, combination and arrangement of parts, herein described, illustrated and claimed.

In the accompanying drawings:—

Fig. 3 is a similar view showing the antiskid members depressed.

Fig. 4 is a fragmentary vertical longitudinal section through the vehicle.

Fig. 5 is a fragmentary side view of one of the antiskid members, illustrating the manner of mounting and operating the same.

Figure 1:
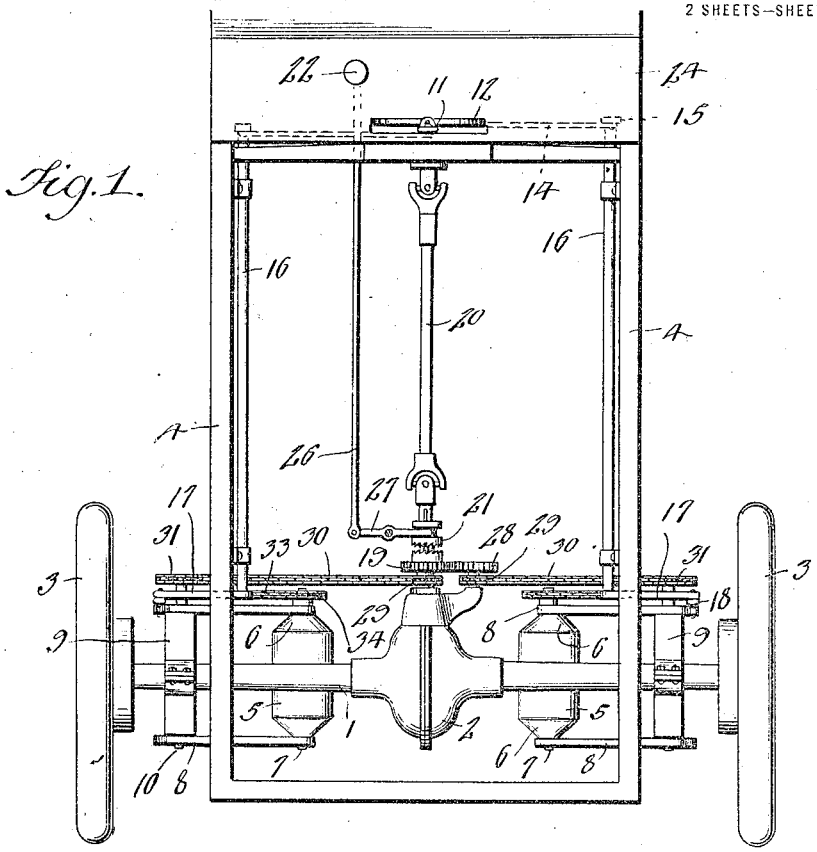
Figure 1 is a plan view of a sufficient portion of a motor vehicle chassis or wheel base to show the invention in its applied relation thereto.

In the preferred embodiment of this invention, the antiskid devices are arranged beneath the rear axle housing, the latter being shown at 1, 2 designating the housing for the differential gearing, 3 the rear driving wheels of the vehicle and 4 the vehicle frame.

In carrying out the present invention in the preferred embodiment thereof, I use two antiskid members 5 each preferably in the form of a cylindrical body having the ends thereof tapered as indicated at 6. Each of the members 5 as will hereinafter appear, constitutes means for elevating the rear portion of the vehicle and also a traction roller, the same being positively driven in a direction which will cause the same, upon coming in contact with the road surface, to roll toward the adjacent driving wheel 3.

Each of the antiskid members or rollers 5 has a shaft 7 which is mounted in the arms 8 of a pivoted hanger, the hanger also comprising a support or clamp 9 which embraces the rear axle housing 1 and is securely fastened in fixed relation thereto. The arms 8 are connected to the clamping member 9 of the hanger by pivots 10 thus enabling the hanger to swing on a horizontal axis at right angles to the rear axle for the purpose of enabling the rollers 5 to be elevated to the position shown in Fig. 2 or depressed to the position shown in Fig. 3 where they engage the road surface to prevent lateral skidding of the vehicle.

Figure 2:
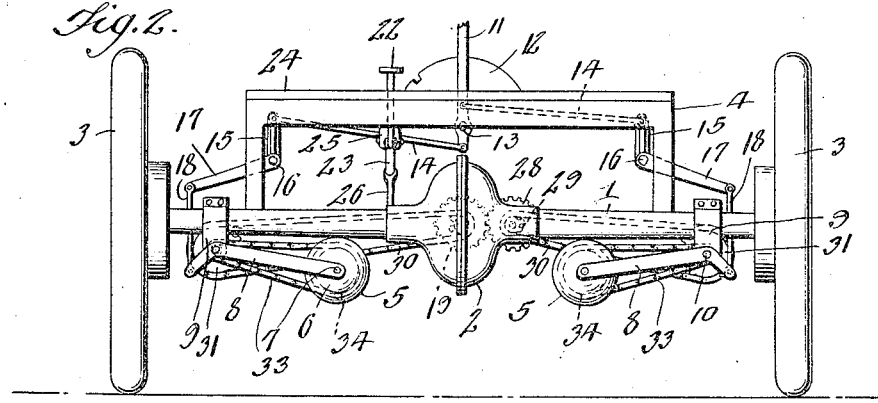
Fig. 2 is a rear elevation of the same showing the antiskid members elevated.

The means for raising and lowering the antiskidding members 5, simultaneously, comprises a hand lever 11 coöperating with a retaining arcuate rack 12, the lever 11 being pivotally mounted at 13 and being connected by link rods 14 to arms 15 on a pair of side longitudinal rock shafts 16 having other arms 17 which are connected by links 18 to one of the arms 8 of each pivoted hanger carrying one of the antiskid rollers 5 as clearly shown in Figs. 2 and 3.

The means for driving the rollers or antiskid members 5 simultaneously in opposite directions, comprises a gear 19 on the drive shaft 20 of the motor vehicle, the gear 19 being normally loose on said shaft but being adapted to be thrown into engagement therewith by means of a clutch 21 slidable on the shaft 20 and manually operable by means of a pedal 22 connected to a bell crank lever 23 supported beneath the floor 24 of the vehicle by means of a bracket 25, the lever 23 being connected by a rod 26 to a clutch shifting fork or lever 27 which engages the clutch 21 as shown in Fig. 1. The gear 19 meshes with another gear 28 of equal size and arranged at one side thereof. The hubs of the gears 19 and 28 are provided with sprocket wheels 29 from which chains 30 extend laterally of the vehicle in opposite directions around larger sprocket wheels 31 on the pivot shafts 10 upon which the hanger arms 8 are mounted for swinging movement as hereinabove described. Bearing a fixed relation to each sprocket wheel 31 is another sprocket wheel 32 from which a chain 33 extends around a sprocket wheel 34 on one end of the shaft 7 of the adjacent traction roller or antiskid member 5.

From the foregoing description taken in connection with the accompanying drawings it will now be understood that the antiskid members or traction rollers which are preferably of cylindrical formation, revolve on axes at right angles to the axes of the driving wheels; also that said rollers are simultaneously driven in opposite directions so that when they are in contact with the road surface, they will roll toward the driving wheels 3, the hangers carrying said rollers being of such dimensions that as the rollers approach the final limit of their movements toward the driving wheels of the vehicle, they will press hard upon the road surface and slightly lift the vehicle driving wheels. The means for driving said antiskid rollers, may be thrown into operation instantly and as quickly thrown out of operation so as not to result in any injury either to the antiskid rollers or the engine or to any of the driving connection. After the skidding movement of the vehicle has been arrested, the antiskid members may be restored to their elevated position as indicated in Fig. 2 where they may be held until again needed. The apparatus hereinabove described may be also conveniently used in a garage or other place for jacking up the driving wheels of the machine for any of the various purposes such as changing tires or placing the vehicle in temporary or dead storage, thereby relieving the weight on the tires when the vehicle is not in use. It will of course be apparent also that the mechanism hereinabove described may be duplicated in connection with the front axle of the vehicle should it be deemed expedient or desirable for any reason.

I claim:

1. In combination with a motor vehicle axle, two oppositely rotatable motor-driven anti-skid rollers connected with said axle and having their axes at right angles to the axes of the vehicle wheels and having cylidrical ground-engaging surfaces.

2. In combination with a motor vehicle, two oppositely rotatable motor driven anti-skid rollers having their axes at right angles to the axes of the vehicle wheels and having cylindrical ground-engaging surfaces, and means for raising and depressing said rollers.

3. In combination with a motor vehicle, two oppositely rotatable motor-driven anti-skid rollers having their axes at right angles to the axes of the vehicle wheels and having cylindrical ground-engaging surfaces, and means for raising and depressing said rollers, said rollers when fully depressed serving to elevate the vehicle wheels off the ground.

In testimony whereof I affix my signature.

AXEL BRASEN.